Aug. 22, 1961
E. A. GAUGLER ET AL
2,997,647
HIGH Q BALANCED SEARCH COIL
Filed Aug. 17, 1951
2 Sheets-Sheet 1
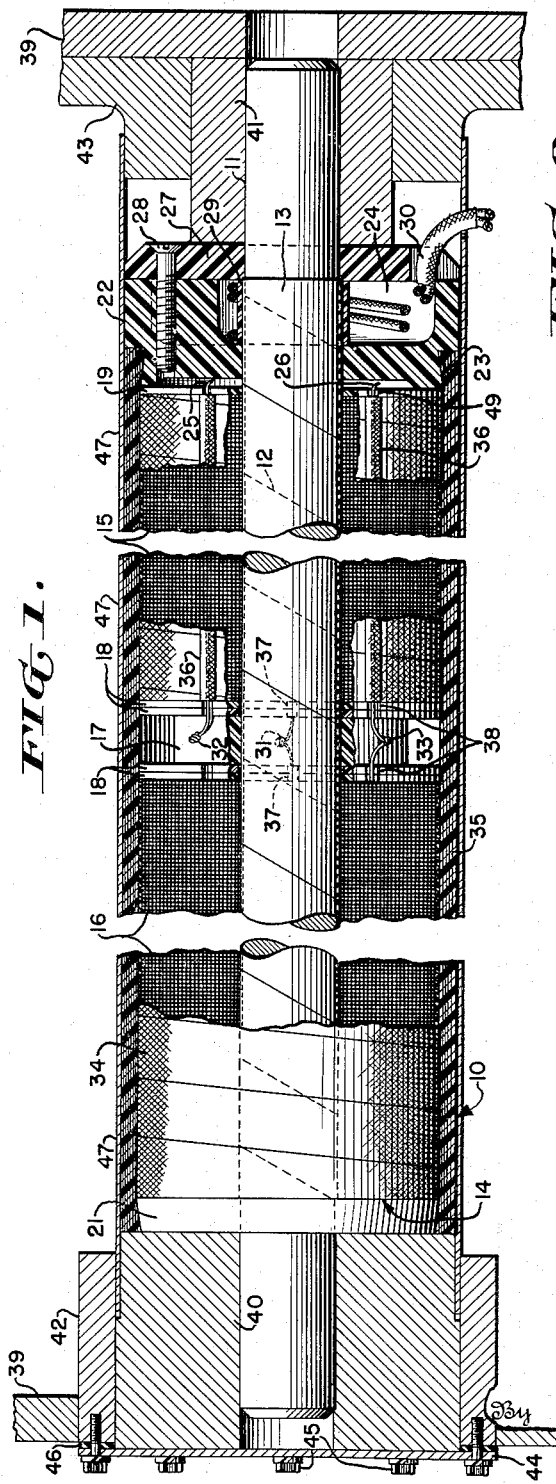
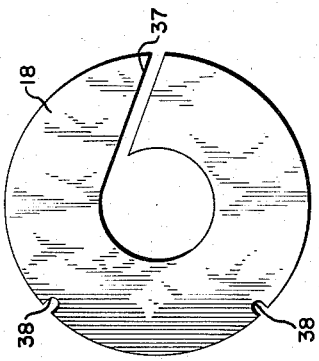
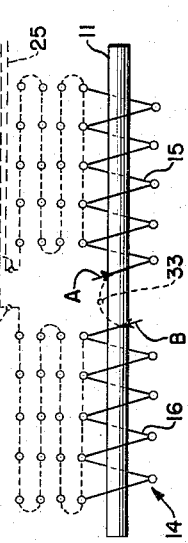
Inventors
*E. A. Gaugler*
*J. W. Burrows*
By
*G. D. O'Brien*
*R. M. Hicks* Attorneys

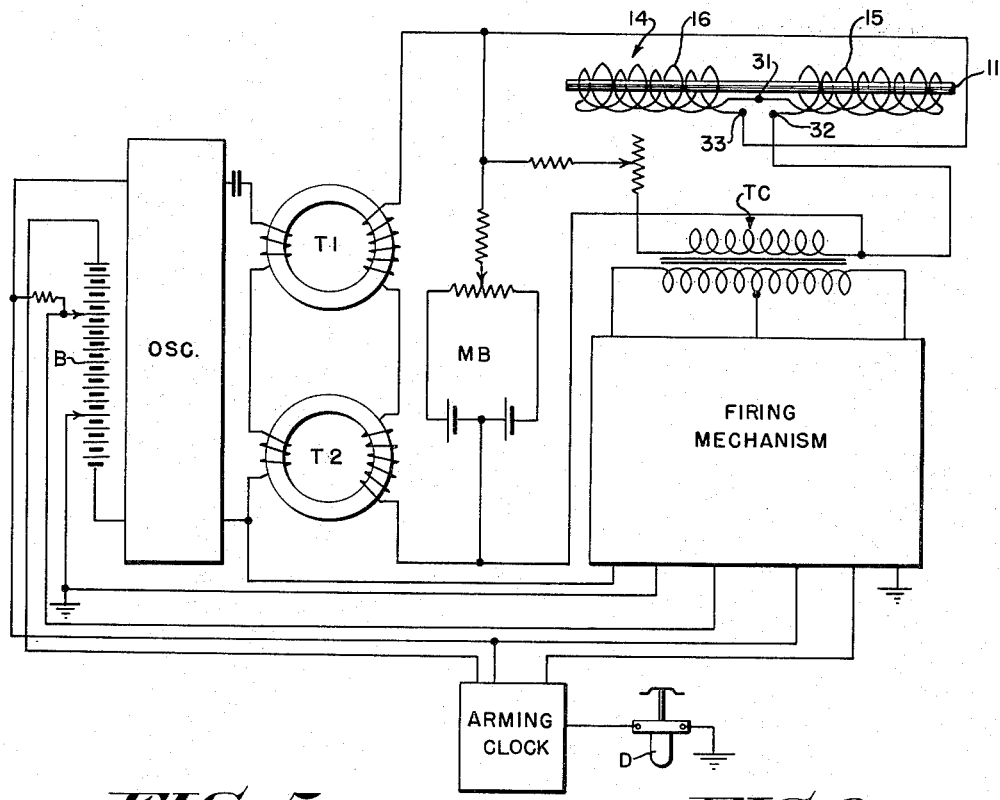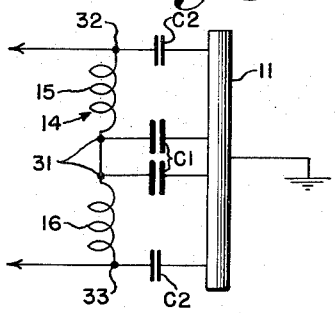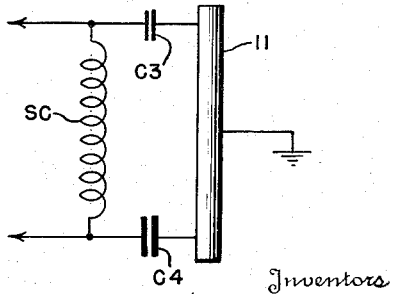

United States Patent Office 2,997,647
Patented Aug. 22, 1961

2,997,647
HIGH Q BALANCED SEARCH COIL
Edward A. Gaugler, Butler, and John W. Burrows, Philadelphia, Pa.
Filed Aug. 17, 1951, Ser. No. 242,396
12 Claims. (Cl. 324—43)
(Granted under Title 35, U.S. Code (1952), sec. 266)

The present invention relates to search coils for use with the firing mechanisms of mines and more particularly to a high Q search coil having balanced capacities to ground and resultant increased sensitivity.

Prior art coils were not found to be entirely satisfactory for use with firing mechanisums such, for example, as that disclosed in the copending application of G. W. Elmen et al. for Magnetic Amplifier, filed June 20, 1945, Serial No. 600,629 for the reason that unbalanced capacities appear between the ends of the coil and ground, which unbalance seriously impairs the sensitivity of the search coil, the unbalance being particularly significant when the mechanism is grounded to the mine case in order to minimize the effect of battery leakage on the balance of the mechanism.

In the case of the particular prior art coil employed with the firing mechanism disclosed in the aforementioned patent application, for example, the coil is wound continuously starting at one end of the core and continuing to the other end thereof, each layer being wound back on the preceding layer. An even number of layers are employed so that both terminals are located at one end of the coil. As mounted in the mine case, the winding of the coil next to the core which, as aforementioned, is grounded to the mine case, has a clearance from the core of .015 inch and a capacity of approximately .01 microfarad between this end of the coil and ground, while the outer layer of the coil is spaced a comparatively much greater distance from the coil tube by the coil jacket with the result that the capacity at this end of the coil is in the neighborhood of .001 microfarad. This unbalance of capacity to ground of the two ends of the coil produces a large unbalance in the output of the magnetic amplifier employed in the firing mechanism because of the high frequency character of its oscillator pulses. It is possible to correct this unbalance by adding external capacity at the outer end of the coil. Sush correction, however, has the undesirable quality of substantially reducing the sensitivity of the mechanism.

The coil of the present invention obviates the capacity unbalance of prior art coils by providing a coil having a pair of signal coil sections in spaced relation with each other along the length of the core, the windings of the sections being started and ending in each case at a point adjacent the center of the core. It will, thus, be apparent that the larger capacities between the inner ends of the coil sections and the ground is adjacent the center of the core and the smaller capacities between the outer ends of the coil sections is also adjacent the center of the core. With such an arrangement, the capacities of both sections of the coil are balanced while, at the same time, the two sections being electrically connected and wound (in effect) in the same direction, the voltages induced in the sections by a uniform change in field are accumulative, the combined sections acting as a single coil.

In practice, the coil is made by winding one section, starting from the center. The coil is then reversed in the winding machine and the other section is wound starting from the center and with the coil rotating in the same direction in the machine.

It is, of course, understood that the start ends of the sections are joined at the center and that the capacities at the outer layers of the two sections are equal and the capacities at the inner layers of the two sections are equal. This being the case, the equal coil sections and the outer capacities comprise a balanced bridge in which there is no potential across the inner capacities which constitute the center leg of the bridge. The effect of the inner capacities is therefore negligible.

An object of the present invention is to provide a new and improved search coil having increased sensitivity.

Another object is to provide a search coil for use with a mine firing mechanism in which the capacities between the ends of the coil and ground are equalized.

Another object is to provide a new and improved search coil for use in a mine and having high sensitivity for the detection of uniform changes in the earth's magnetic field.

A further object resides in th provision of a high Q balanced search coil in which the capacities between ground and the inner and outer layers of the coil are arranged in a bridge circuit.

A further object is to provide a search coil for a mine having the qualities of durability, strength and economy of manufacture.

A still further object is to provide a new and improved method of making the coil of the present invention.

Other objects and many of the attendant advantages of this invention will be readily appreciated as the same becomes better understood by reference to the following detailed description when considered in connection with the accompanying drawings wherein:

FIG. 1 is a longitudinal sectional view of a preferred form of a sectional search coil constructed in accordance with the present invention;

FIG. 2 is an elevation of one of the disks employed in the present invention;

FIG. 3 is a view in diagrammatic form of the method of winding the sections of the coil of the present invention;

FIG. 4 is a view in diagrammatic form of a mine firing circuit employing a search coil constructed in accordance with the principles of the present invention;

FIG. 5 is a view in diagrammatic form of the balanced bridge formed by the capacities and coil sections of the coil; and FIG. 6 is a diagrammatic view of a prior art unbalanced search coil in which the capacities between the core and the ends of the coil are unequal.

Referring more particularly to the drawings wherein like numerals indicate like parts throughout the several views a preferred embodiment of the search coil of the present invention is indicated generally at 10. A metallic core of suitable magnetic material such, for example, as "Permalloy" or 'Mumetal" is indicated at 11 and has two layers of acetate fiber tape 12 and 13 spirally wrapped thereon in such a manner that the abutting edges of one layer are positioned intermediate the abutting edges of the other layer. A coil 14 comprising a pair of coil portions or sections 15 and 16 is wound over tape 13, the coil being composed of paper wrapped enamelled copper wire.

A molded phenolic dividing flange 17 is placed on the core in a position substantially intermediate the ends thereof and a pair of laminated phenolic disks 18 are mounted at each side of flange 17 prior to winding the second section of the coil 14. It will thus be seen that disks 18 and flange 17 are interposed between the two sections 15 and 16 of coil 14. Laminated phenolic disk 19 is mounted adjacent the outer end of section 15, while tapered phenolic cap 21 is mounted adjacent the outer end of section 16. Molded phenolic terminal housing 22 is mounted on core 11 adjacent disk 19. The periphery of housing 22 is provided with a tapered reduced portion 23 similar to the taper of cap 21.

Terminal housing 22 is formed with a chamber 24 for receiving the terminal wires or coil leads 25 and 26 of coil 14. A cover plate 27 is secured to housing 22 by means of screws 28, one only appearing in FIG. 1. In order to ensure complete insulation of wires 25 and 26 from core 11 a phenolic tubular member 29 is provided in chamber 24 on core 11.

The inner ends of the windings of coil sections 15 and 16 are joined as at 31, while the outer ends of the sections are joined to terminal wires 25 and 26 as at 32 and 33 respectively.

Sections 15 and 16 are covered with a winding of cotton tape 34 at the periphery thereof.

In order to provide a strong moisture-proof container for coil 10 a casing 35 comprising layers of plywood and paper impregnated with a phenolic compound is formed thereabout and extends over the tapered disk 21 and the tapered portion of housing 22, the casing 35 having complementary tapers at the ends to cooperate with the tapers of disk 21 and housing 22 in securing the components of the device in unitary arrangement.

Terminal wires 25 and 26 are formed of flat silver braid 36 along the length of portion 15 of coil 14 in order to present a substantially concentric peripheral surface to the coil portion 15.

In forming the coil 14, disks 18, disk 19, dividing flange 17, and cap 21 are placed on tape wrapped core 11 substantially in the positions indicated in FIG. 1 of the drawings. In addition thereto, the ends of the core 11 are respectively provided with winding washers and fittings (not shown) and the core is mounted in a suitable coil winding machine for rotation thereby.

In order to prepare the core 11 for the winding operation the dividing flange 17 is fixed to the core midway of the ends thereof by means of a suitable clamp (not shown). A few turns of the wire which is to form portion 15 of coil 14 is wound on the core in the direction of arrow A FIG. 3 starting at the flange 17, the disks 18 being temporarily positioned intermediate the flange 17 and one end of the core 11. After a few turns of wire have been wound, the disks are moved over the winding to a position adjacent the flange 17, the winding end of the wire being passed through a slot 37 in each of the disks 18. The start end of the wire is passed through the slot 37 of the first disk and temporarily secured in any suitable manner to flange 17, the second disk being for the purpose of insulating the start end of the wire from subsequent windings of the coil.

After the disks 18 and 19 are properly positioned and the notches 49 of disk 19 are brought into alignment with notches 38 of disks 18 the winding of section 15 of the coil is continued in the direction of arrow A, the last layer of the winding ending adjacent the disks 18 and at a point 135 degrees away from slot 37 at one of the notches 38. The finish end of the wire is secured at notch 38 and cotton tape is wound around the coil section and firmly secured thereon.

The core is removed from the winding machine and replaced therein in a reversed position, i.e., reversed end to end, the space to be occupied by section 16 being in the position formerly occupied by section 15. The wire of section 16 is wound in the same manner as that of section 15, the core being rotated in the same direction in the winding machine as indicated by the direction of arrow B and the disks 18 for coil section 16 being arranged in the same manner as the disks 18 of section 15.

After the winding of coil section 16 is completed, the end of the wire is temporarily attached to the notch 38 in one of the disks 18 and in alignment with the end of the wire forming section 15. The periphery of section 16 is wound with cotton tape in the same manner as section 15.

The core and windings 15 and 16 are removed from the winding machine, fastened to a treating rack (not shown), and placed in a tank capable of being sealed in airtight condition. The tank is evacuated of air for a period of approximately four hours, pressure within the tank being in the order of one inch of mercury, after which a quantity of suitable varnish is admitted into the tank, care being taken to prevent the admission of air therein. Nitrogen gas is admitted to the tank under a pressure of 65 lbs. p.s.i. The varnish is removed from the tank and the tank is evacuated of air for a period of four hours in the manner heretofore stated.

The coil is removed from the tank and excess varnish is drained therefrom for one hour. The coil is baked in an oven for eight hours at 220° to 240° F. and for ten hours at 275° to 290° F. Thereafter the coil is removed from the oven, cooled, and removed from the rack.

The coil is prepared for the application of the outer casing by removing the portions of the tapes 12 and 13 adjacent the ends of core 11 and by joining the start wires of sections 15 and 16 while the finish wires thereof are respectively joined to wires 25 and 26 which are passed through notches 38 of disks 18 of section 15, across the coil winding thereof over the cotton tape 34 within the braided cover 36 and through the notches in disks 19. The braid 36 is suitably insulated. The winding washer and winding fixture adjacent disk 19 are removed and replaced by terminal housing 22. Leads 25 and 26 are brought through suitable slots in housing 22, not shown, into chamber 24 and wrapped around insulating tubular member 29, the leads being suitably covered with insulation, as indicated in FIG. 1. Cover plate 27 is secured to housing 22, terminal leads 25 and 26 being brought through a suitable slot 30 in the periphery of the plate 27.

The casing 35 is now applied to the coil, the casing extending from the wall defined by the tapered portion 23 of the housing 22 across the sections 15 and 16 of coil 14 and across the taper of cap 21 and ending at the outer edge of the cap.

The casing 35 is formed of alternate layers of paper coated on one surface thereof with a phenolic heat setting resin and of hardwood veneer. A first layer of paper is wrapped around the coil with the phenolic coating on the outside and the wrapping is continued with alternate layers of the veneer and paper until approximately 30 inches of veneer has been used. The wrapping is continued with layers of coated paper and the final layer comprises a spiral wrapping of closely woven cotton cloth impregnated with the phenolic resin employed heretofore in coating the paper.

The entire coil assembly is heat cured in an oven at a suitable temperature and thereafter one coat of flat black phenolic resin paint is applied thereto.

It will be apparent that such method provides a coil which is moisture-proof, durable, and which has desirable electrical characteristics as will be hereinafter more fully described.

As illustrated in FIG. 4 of the drawings the search coil 14 of the present invention is employed as an example of use with the mine firing circuit disclosed in the aforementioned copending application of G. W. Elmen et al., filed June 20, 1945, Serial No. 600,629 for Magnetic Amplifier.

The coil 14 of the present invention is connected in the circuit in the same manner as is coil SC of the aforementioned application, the coil being connected in series with a pair of oppositely connected secondary coils of toroidal transformers T1 and T2. Connected in parallel with coil 14 across the secondary coils of transformers T1 and T2 is a magnetic bias circuit MB for equalizing the magnetization of the cores of transformers T1 and T2. Primary winding of transformer TC is also connected across terminals 32 and 33 of coil 14 and across the oppositely connected secondary coils of transformers T1 and T2. The secondary winding of transformer TC is tapped at the center and connected to one side of a pair of circuits of the firing mechanism for receiving signals of opposite polarity respectively, one end of the secondary winding of TC being connected to one of the circuits, the other end of this secondary winding being connected to the other of the circuits. From the foregoing, it will be apparent that when a voltage of a certain polarity is induced in the secondary winding of transformer TC one circuit will be energized, while when a voltage of the opposite polarity is induced in the secondary winding the other circuit will be energized. When a pair of signals of opposite polarities are detected by the search coil 14 in response to changes in the magnetic field linked by the coil and due to the magnetic influence of an approaching vessel, an additive signal is developed by the aforesaid circuits of the firing mechanism sufficient to fire the detonator D.

The operation of the circuit is described in further detail in the aforementioned copending Elmen et al. application and also in the copending application of Whitman D. Mounce et al. for Mine Firing Control System, Serial No. 594,133, filed May 16, 1945.

The search coil disclosed in these applications has the disadvantages recited heretofore with relation to prior art coils, that is, the ends of the coil are unbalanced with respect to ground and, therefore, the output thereof is seriously impaired. In FIG. 6 of the drawings the prior art coil is indicated at SC, the core at 11 and the capacity to ground at the outer and inner layers of the coil at C3 and C4 respectively.

The prior art core 11 as well as the core 11 of the present invention are grounded to the mine casing 39, FIG. 1, by way of the "Permalloy" supporting sleeves or core extension 40 and 41 at the ends thereof, the sleeves, in turn, being supported in the casing members 42 and 43, respectively, which are suitably secured to the casing as by welding thereto, for example, a retaining plate 44, secured as by bolts 45 to casing member 42 serves to hold the coil assembly in position within the casing, a gasket 46 being inserted between plate 44 and casing member 42 to provide a watertight seal therebetween. A metallic tubular casing or sheath 47, which fits over the core extension 40 and the casing member 43, as illustrated, is thus also grounded to the casing and encloses the coil assembly 14. Thus, in the case of the prior art coil of FIG. 6, the inner layer of the coil being closely spaced from the grounded core 11 has a large capacity to ground, while the outer layer and the outer grounded casing has a small capacity to ground. It will thus be apparent that while the output of signals of one polarity received by coil SC will be strong, the output of signals of the opposite polarity will be relatively weak. It is obvious that such unbalanced signals would seriously interfere with the desired operation of the firing mechanisms of the copending applications. This effect is particularly serious when the mechanisms are grounded to the mine case in order to reduce the effect of battery leakage on the balance of the mechanisms.

The coil of the present invention as indicated diagrammatically in FIG. 5 comprises the pair of coil sections 15 and 16 having the inner windings thereof joined together at 31 and having large capacities to ground to shown at C1. The outer windings of the sections 15 and 16 are provided with terminals 32 and 33 respectively and have small capacities to ground as shown at C2. It will be apparent from FIG. 5 that such arrangement provides a coil having balanced output ends thus having substantially equal output of signals of either polarity received thereby and therefore the coil will successfully operate the firing mechanisms of the copending applications.

Referring again to FIG. 6, it will be apparent that the resonance frequency of the unbalanced coil circuit disclosed therein is given approximately by the following equation, C3 being less than C4:

$$\omega = \frac{1}{\sqrt{LC3}}$$

where:
$\omega$ is the frequency
L is the inductance of coil SC
C3 is the capacitance of the outer layer to ground
C4 is the capacitance of the inner layer to ground Referring now to FIG. 5, it will be apparent that the resonance frequency of the balanced circuit disclosed therein is given approximately by the following equation:

$$\omega = \frac{1}{\sqrt{L\left(\frac{1}{C2}+\frac{1}{C2}\right)}} = \frac{1}{\sqrt{L\left(\frac{C3}{2}+\frac{C3}{2}\right)}} = \frac{1}{\sqrt{\frac{LC3}{4}}} = \frac{2}{\sqrt{LC3}}$$

where:
$\omega$ is the frequency
L is the inductance of coil 14

$$C2 = \frac{C3}{2}$$

= capacitance of outer layer to ground of each of coil sections 15 and 16.

It will be noted that the resonance frequency of the balance search coil is twice that of the unbalanced coil with a resultant higher Q and increased sensitivity. It will further be noted that coil sections 15 and 16 and capacities C2 comprise the four arms of a bridge in which capacities C1 comprise the center leg of the bridge. Since the coil sections 15 and 16 are equal and, further, since capacitances C2 are equal, there is no potential difference across capacitances C1, the effect of capacitances C1 is negligible.

It will be understood that a search coil of the type herein described comprise a large number of turns of low resistance wire with resultant high Q and consequent high sensitivity for the mine firing system employing the search coil. It will be appreciated therefore that the achievement of balancing the capacities of the coil to ground with a resultant increase in the Q of the coil, as aforedescribed, contributes materially in increasing the sensitivity of the mine firing system.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed and desired to be secured by Letters Patent of the United States is:

1. A search coil for detecting changes in receiving a magnetic field and influencing the firing circuit of a mine comprising, a core of ferromagnetic material, a coil having a pair of spaced coil sections each having a start end and finish end and wound on said core in spaced relation therealong and in series aiding arrangement with respect to said field, each of said sections having a plurality of layers, the inner layer of each section being wound from the center toward the end of the core, the outer layer of each section being wound from the end of the core to the center thereof, said start ends of said sections being joined intermediate the sections, said finish ends being arranged intermediate the sections and serving as the output terminals of the coil.

2. A search coil as in claim 1 and including terminal leads connected to said output terminals and extended adjacent the outer layer of one of said coil sections to one end of the search coil.

3. A search coil for detecting changes in a magnetic field and influencing the firing circuit of a mine comprising, in combination, a grounded core, a pair of spaced multi-layer coils wound along the length of said core, and a grounded casing for said coils, the inner layer of each of said coils being wound from the center of the core toward one of the ends thereof, the outer layers of said coils being wound respectively from said ends of the core to the center thereof, said coils having the start and finish ends thereof adjacent the center of the core whereby the capacities between the start ends of the coils and ground are balanced and the capacities between the finish ends of the coils and ground are balanced.

4. A search coil for receiving magnetic signals and for influencing the firing circuit of a marine mine comprising, an elongated cylindrical core, a first winding on said core for receiving said signals and arranged on one side of the longitudinal center of said core, a second winding on said core spaced from said first winding for receiving said signals and arranged on the other side of the longitudinal center of said core, said first and second windings being wound and interconnected to receive said signal accumulatively, an insulating dividing flange mounted on said core at the longitudindal center thereof, a plurality of insulating disks interposed between said dividing flange and the inner end of the first and second windings, said first and second windings having the start ends thereof joined together in the space provided by the reduced diameter of said flange, a pair of flat braided leads respectively attached to the output ends of said windings, an insulated end plate having a tapered periphery mounted adjacent the outer end of said second winding, a housing having a tapered peripheral portion for said leads mounted adjacent the outer end of said first winding, said leads passing over said first winding and suitably insulated therefrom and passing into said housing, and an insulating casing for said coil in interlocking engagement with the tapered periphery of said end plate at one end thereof and with the tapered peripheral portion of said housing at the other end thereof, said casing comprising alternate layers of paper and thin wood veneer impregnated with a heat setting resin.

5. A search coil for detecting changes in a magnetic field and influencing the firing circuit of a mine comprising, a grounded core, a tape spirally wrapped on said core, a pair of spaced coils wound on said core over said tape, a grounded metallic housing for said coils, said pair of coils having the start ends thereof connected together in spaced adjacency to the longitudinal center of said core and having a high capacity to ground, said pair of coils having the output ends thereof in spaced adjacency to said housing adjacent said longitudinal center and having a low capacity to ground, said coils being joined at the start ends thereof and wound in the same direction about said core so as to be inductively accumulative in effect with respect to said field, each of said coils having a plurality of layers, the inner layer of each coil being wound from the center of the core toward the end thereof and the outer layer of each coil being wound from the end of the core to the center thereof.

6. A search coil for receiving a magnetic signal and influencing the firing circuit of a mine comprising, a grounded core having a plurality of layers of insulating tape spirally wrapped thereon, an insulating spacer arranged on said core at the longitudinal center thereof, two pairs of notched and slotted insulating disks respectively arranged in face adjacency at the sides of said spacer and having a greater diameter than said spacer, an insulating cap member mounted on said core in spaced adjacency to one end thereof, a single insulating slotted disk mounted on said core in spaced adjacency to the opposite end thereof, a first coil wound on said core and having the start wire thereof passing through the slots of one pair of said slotted disks to said spacer, said first coil being wound between said pair of disks and said single disk, a second coil wound on said core in series aiding relation to said first coil and having the start wire thereof passing through the other pair of said slotted disks to said spacer, said second coil being wound between said other pair of disks and said cap member, the start wires of said first and second coils being joined together adjacent said spacer, the finish wires of said first and second coils passing through the notches of said disks to said spacer, a pair of flat braided lead conductors respectively joined to said finish wires and passing over said first coil and through other notches in the disks associated therewith, a terminal housing mounted on said core, said conductors passing through said housing, a cotton tape wrapping for each of said coils respectively, an outer casing for said coils comprising a wrapping of a plurality of alternate layers of paper and wood veneer impregnated with a heat setting resin and extending from said cap to said terminal housing, and a tubular metallic sheath enclosing said casing.

7. The method of fabricating a search coil for induction mines comprising the steps of spirally wrapping the entire length of a ferromagnetic core with a plurality of layers of insulating plastic adhesive tape, sliding a pair of slotted and notched insulating disks, a notched disk, a winding disk, and a winding fixture on one end of said core in sequential order, securing said winding fixture to said core, sliding a spacer disk, a second pair of slotted and notched insulating disks, an insulating cap, a second winding washer, and a second winding fixture on the other end of said core in sequential order, securing said second winding fixture to said other end, clamping said spacer disk on said core at a predetermined central position thereon, placing the core assembly in a winding machine, winding a few turns of wire adjacent the spacer disk, passing the pair of slotted, and notched disks over the wound portion of the wire and adjacent the spacer disk, running the start end of the wire through the slot of the disk next adjacent the spacer disk, fixing a notched disk in a position adjacent the winding disk with the notches thereof aligned with notches of the slotted and notched disks, continuing the winding of the wire in layers between the slotted and notched disks and the notched disk to form a first coil ending the winding operation with the finish wire adjacent the slotted and notched disks and 135 degrees away from the start wire slot, wrapping the periphery of the completed first coil with cotton tape, reversing the position of the core and coil assembly in the winding apparatus, winding a second coil between the slotted and notched disks and the cap in the manner of the first coil and with the core rotating in the same direction, ending the winding operation with the finish wire 90 degrees from the finish wire of the first coil, and wrapping the completed second coil with cotton tape.

8. The method of claim 7 and including the further steps of fastening the core and coil assembly in a treating rack, placing the assembly in a tank, exhausting the air therefrom for 4 hours, admitting a quantity of suitable varnish therein, applying nitrogen gas under a pressure of 65 pounds p.s.i. for a period of 5 hours, removing the excess varnish, exhausting the tank for 4 hours, removing the assembly, draining for 1 hour, baking in an oven at a temperature of 200° to 240° F. for 8 hours, continuing the baking at a temperature of 275° to 290° F. for 10 hours, removing the assembly from the oven and cooling, and removing the assembly from the rack.

9. The method of claim 7 including the further steps of splicing the two start ends of the coils together at the center of the core between the two coils, soldering a flat braided conductor to each of the finish wires, bringing the conductors through the notches in the disks and over the cotton tape wrapping of the first coil, suitably insulating the conductors, removing the winding fixture and winding washer from the end of the coil adjacent the first coil, applying in the place thereof a terminal housing, threading braid conductors through housing, wrapping the conductors around the core within the housing, applying a cover plate to the housing, applying a holding fixture on the end of the core to hold the assembly in place on the core, wrapping on the periphery of the assembly alternate layers of paper coated on one side with a heat setting phenolic resin and hardwood veneer until approximately 30 inches of wood veneer have been used, continuing the wrapping with the coated paper until the casing has been brought to a predetermined diameter, spirally wrapping thereon a final layer of closely woven cotton impregnated with the same heat setting phenolic resin, heat curing the assembly, applying a coat of flat black phenolic resin paint, removing the winding fixture and winding washer from the end of the assembly adjacent the second coil, removing the holding fixture from the other end of the assembly, removing the cover plate from the housing, attaching a cable to the braided conductors, suitably tying the cable around the core within the housing, filling the housing with wax to seal the wires contained therein, replacing the cover plate on the housing, and removing insulating plastic adhesive tape from the exposed portions of the core.

10. A high Q search coil having balanced capacities and comprising, in combination, a core having high permeability to weak magnetic fields, and two symmetrical coil sections arranged in mutually spaced relation in said core, each of said coil sections comprising a plurality of layers each including a large number of turns of wire of low resistance, said coil sections being wound on said core starting from the center thereof and in opposite directions of rotation whereby all of said turns are in the same direction, said coil sections having the start wires thereof electrically connected together whereby the voltages induced in the coil sections by uniform changes in said magnetic fields are accumulative.

11. A search coil of the character disclosed comprising a grounded core, a pair of symmetrical coil sections mutually spaced on said core, and a grounded casing for the coil, said sections each having an even number of layers and having the start wires thereof started at the core intermediate the sections whereby the finish wires of the sections end up intermediately thereof and the capacity to ground of the outer layer of the coil is divided equally between the two sections, said start wires of the coil being wound in opposite directions about the core and electrically spliced together whereby the turns of the coil are all in the same direction and the voltages induced therein by a changing magnetic field linked therewith are accumulative.

12. A search coil of the character disclosed comprising a core, and a pair of multi-layer windings disposed in coaxial alignment on said core, said sections having the inner layers thereof wound about the core from the center of the core outward, said sections having successive layers thereof wound back on the preceding layers, said inner layers having the start wires thereof electrically connected together.

References Cited in the file of this patent

UNITED STATES PATENTS

| | | |
|---|---|---|
| 2,388,598 | Cahill | Nov. 6, 1945 |
| 2,391,229 | D'Entremont | Dec. 18, 1945 |
| 2,457,773 | Cawein | Dec. 28, 1948 |
| 2,488,325 | Peek | Nov. 15, 1949 |
| 2,546,968 | Bridges | Apr. 3, 1951 |